United States Patent [19]

Molley

[11] Patent Number: 5,060,282
[45] Date of Patent: Oct. 22, 1991

[54] OPTICAL PATTERN RECOGNITION ARCHITECTURE IMPLEMENTING THE MEAN-SQUARE ERROR CORRELATION ALGORITHM

[75] Inventor: Perry A. Molley, Albuquerque, N. Mex.

[73] Assignee: The United States of America as represented by the United States Department of Energy, Washington, D.C.

[21] Appl. No.: 499,120

[22] Filed: Mar. 26, 1990

[51] Int. Cl.$^5$ ............................................. G06K 9/58
[52] U.S. Cl. ........................................ 382/42; 382/31; 359/561
[58] Field of Search ...................... 350/162.11, 162.12, 350/162.13, 162.14; 382/31, 42

[56] References Cited

U.S. PATENT DOCUMENTS

| 3,947,123 | 3/1976 | Carlson et al. | 356/39 |
| 4,067,645 | 1/1978 | Carlson et al. | 350/162 SF |
| 4,082,431 | 4/1978 | Ward, III | 350/162 SF |

OTHER PUBLICATIONS

D. Psaltis, "Incoherent Electro-Optic Image Correlator", *Optical Engineering*, Jan./Feb. 1984, vol. 23, No. 1, pp. 12–15.

(List continued on next page.)

*Primary Examiner*—Leo H. Boudreau
*Assistant Examiner*—David Fox
*Attorney, Agent, or Firm*—Karla Ojanen; James H. Chafin; William R. Moser

[57] ABSTRACT

An optical architecture implementing the mean-square error correlation algorithm, $$MSE = \Sigma [I-R]^2$$

for discriminating the presence of a reference image R in an input image scene I by computing the mean-square-error between a time-varying reference image signal $s_1(t)$ and a time-varying input image signal $s_2(t)$ includes a laser diode light source which is temporally modulated by a double-sideband suppressed-carrier source modulation signal $I_1(t)$ having the form $$I_1(t) = A_1[1 + \sqrt{2}m_1s_1(t)\cos(2\pi f_o t)]$$

and the modulated light output from the laser diode source is diffracted by an acousto-optic deflector. The resultant intensity of the +1 diffracted order from the acousto-optic device is given by:

$$I_2(t) = A_2[+2m_2^2s_2^2(t) - 2\sqrt{2}m_2(t)\cos(2\pi f_o t)]$$

The time integration of the two signals $I_1(t)$ and $I_2(t)$ on the CCD deflector plane produces the result $R(\tau)$ of the mean-square error having the form:

$$R(\tau) = A_1 A_2 \{[T] + [2m_2^2 \cdot \int s_2^2(t-\tau)dt] - [2m_1m_2\cos(2\pi f_o\tau) \cdot \int s_1(t)s_2(t-\tau)dt]\}$$

where:
$s_1(t)$ is the signal input to the diode modulation source;
$s_2(t)$ is the signal input to the AOD modulation source;
$A_1$ is the light intensity;
$A_2$ is the diffraction efficiency;
$m_1$ and $m_2$ are constants that determine the signal-to-bias ratio;
$f_o$ is the frequency offset between the oscillator at $f_c$ and the modulation at $f_c + f_o$; and
$a_o$ and $a_1$ are constant chosen to bias the diode source and the acousto-optic deflector into their respective linear operating regions so that the diode source exhibits a linear intensity characteristic and the AOD exhibits a linear amplitude characteristic.

13 Claims, 11 Drawing Sheets

OTHER PUBLICATIONS

P. Kellman, "Time Integrating Optical Signal Processing", Ph. D. Dissertation, Stanford University, 1979, pp. 51–55.

P. Molley, "Implementing the Difference-Squared Error Algorithm Using An Acousto-Optic Processor", SPIE, vol. 1098, 1989, pp. 232–239.

W. Rhodes, "Acousto-Optic Signal Processing: Convolution and Correlation", Proc. of the IEEE, vol. 69, No. 1, 01/81, pp. 65–79.

A. Vander Lugt, "Signal Detection By Complex Spatial Filtering", *IEEE Transactions On Information Theory*, IT-10, vol. 2, 04/64, pp. 139–145.

D. Psaltis, "Two-Dimensional Optical Processing Using One-Dimensional Input Devices", *Proceedings of the IEEE*, vol. 72, No. 7, Jul. 1984, pp. 962–974.

P. Molley et al., "A High Dynamic Range Acousto-Optic Image Correlator for Real-Time Pattern Recognition", *SPIE*, vol. 938, 1988, pp. 55–65.

FIG. 1(a)    INPUT SIGNALS    FIG. 1(b)

FIG. 1(c)    CORRELATION RESULTS    FIG. 1(d)

FIG. 1(e)    DSE RESULTS    FIG. 1(f)

s(f) input signal

Diode Source Modulation

AOD Squared Function

Input Data #1

Input Data #2

Input Data #3

Optical MSE Correlation Result

Optical MSE Correlation

Digital MSE Correlation

Correlation #1

Correlation #2

Correlation #3

Difference Squared #1

Difference Squared #2

Difference Squared #3

MSE Correlation #1

MSE Correlation #2

MSE Correlation #3

OPTICAL PATTERN RECOGNITION ARCHITECTURE IMPLEMENTING THE MEAN-SQUARE ERROR CORRELATION ALGORITHM

The United States Government has rights in this invention pursuant to Contract No. DE-AC04-76DP00789 awarded by the United States Department of Energy to AT&T Technologies, Inc.

BACKGROUND AND SUMMARY OF THE INVENTION

The present invention relates to optical computing and image and pattern recognition systems and techniques in general and, more particularly, to an optical architecture for accomplishing real-time two-dimensional pattern recognition by implementing the so-called "Mean-Square-Error" correlation algorithm (also referred to as the "Difference-Squared Error" algorithm) for discriminating, i.e., recognizing two-dimensional patterns in gray-scale images.

Previously, real-time electronic and optical architectures for pattern recognition have utilized basic correlation (and convolution) operations for discriminating desired objects (targets and image patterns of interest) from unwanted objects and residual background "clutter" in an input scene being imaged.

However, basic correlation methods do not perform particularly well in processing certain gray-level input scenes and input scenes with high average value background levels such as encountered in automatic target recognition environments, making correlators unsuitable for solving certain image recognition problems. For example, a bright spot in the input scene, such as might be caused by a flare or a bright background feature, can produce a large correlation peak thereby causing the recognition system to incorrectly indicate the presence of an object or target in the input scene. Edge-enhancement processing may in some cases be beneficial for avoiding such false indications, however, then the gray level characteristics of the signals are lost while the background noise tends to be emphasized. Thus, the target recognition environment has proven to be a particularly difficult area for correlation-based pattern recognition systems.

Another technique for performing two-dimensional pattern recognition known as the "difference-squared error" (DSE) algorithm method involves computing the squared difference of a reference template, R(x,y), over the entire region of a larger input image, I(x,y). If it is assumed that the input image is N×N pixels in dimension and that the reference template is M×M pixels in size, the difference-squared error can be expressed as:

$$DSE(n_x, n_y) = \int M_y \int M_x [I(m_x+n_x, m_y+n_y) - R(m_x, m_y)]^2 dm_x dm_y \quad (1)$$

Equation (1) can be used to find the difference-squared error between the reference template and the input image at every location in the input image. When a segment in the input image exactly matches the reference template, the difference will be zero (0) and the resulting value in the difference-squared error matrix, DSE $(n_x, n_y)$, will also be zero. When the input image segment differs from the template by some amount, the magnitude of the result indicates the degree of this mismatch.

The difference-squared error algorithm can provide much better discrimination of gray-level objects than correlation. For example, when a triangle-shaped signal as shown in FIG. 1(a) is correlated with itself and with the square-shaped signal in FIG. 1(b), the results are as shown in FIGS. 1(c) and 1(d), respectively. As may be seen from these figures, the correlation operation between the triangular signal and the square signal produces a higher correlation peak than does the auto-correlation of the triangular signal with itself. And therefore the triangle-shaped signal can not be discriminated from the square-shaped signal by thresholding the output of the correlation even when, as shown by the dashed line in FIGS. 1(c) and 1(d), the match-mismatch correlation threshold is set proximate the apex of the auto-correlation peak.

However, if the DSE algorithm is applied to the same signals, the results are quite different. As shown in FIG. 1(e), the result of the DSE correlation performed between the two triangle-shaped signals produces an output of zero indicating a no-error or match condition between these two signals. But when the DSE correlation operation is performed between the square and triangle signals, a large mismatch is present producing a large error result. This causes the resultant output level as shown in FIG. 1(f) to be well above the dashed line threshold level. A simple thresholding operation can then be used to discriminate between the DSE outputs of FIGS. 1(e) and 1(f). Thus, the DSE algorithm can provide much better discrimination of gray-scale inputs than can the basic correlation technique.

For implementing the DSE algorithm, it is convenient to rewrite equation (1) by expanding the terms therein as follows:

$$DSE(n_x, n_y) = \int M_y \int M_x [I^2(m_x+n_x, m_y+n_y) + R^2(m_x, m_y) - 2I(m_x+n_x, m_y+n_y) R(m_x, m_y)] dm_x dm_y \quad (2)$$

The three terms in equation (2) can be generated using correlation. The first term represents the auto-correlation of the input image. The second term is the auto-correlation of the reference template. The third term is proportional to the cross-correlation of the input image with the reference template. It has been suggested that this difference squared operation can be performed in real-time using a fast electronic or optical correlator to compute the input-dependent terms, $I^2(\ )$ and $2I(\ )R(\ )$. Since the second term, $R^2(\ )$, is only a function of the reference template, it can be generated a priori. The results of these three correlations can then be added or subtracted electronically to produce the desired difference-squared result in real time. However, such an implementation poses formidable computational problems.

In order to compute DSE algorithm equation (2) in real-time, the processor must be capable of maintaining an extremely high throughput rate yet must also maintain a large number of bits of precision. For every new input image or reference template to be processed, a new correlation must be performed. For large input images, this computation involves processing enormous amounts of data.

For example, a common target recognition scenario involves images that are 512×512 pixels in size, and reference templates that are 64×64 pixels in size. Computational problems of this magnitude require more than one billion operations (i.e. multiply/adds) to be performed for obtaining a single difference-squared result. At an image frame input rate of 30 frames per second, this requires more than $6 \times 10^{10}$ operations to be performed per second for real-time processing. This throughput rate is required for comparing only one reference template against an input image. In typical situations, the object of interest may have an arbitrary orientation (and size) in the input scene, so that many different rotated (and possibly also scaled) versions of the reference template must be tried against the same input image. If only as few as forty (40) different templates are required to take into account these variances, the throughput rate requirement will then exceed $10^{12}$ operations per second. Furthermore, since each pixel in the input image and the reference templates represents gray-level values, typically 8-bit data quantities, each term in equation (2) must accommodate up to 28 bits of precision for a template that is $64 \times 64$ pixels in size. These processing requirements are formidable for any system to meet; however, for automatic target recognition applications the high throughput processor must also satisfy stringent size, weight and power consumption restrictions. Electronic processing architectures have great difficulty in simultaneously meeting all of the requirements for high speed, high degree of computational precision and a restricted operating environment. Thus, problems have remained in implementing this technique with electronic architectures.

Optical processing architectures are particularly well-suited to problems involving large two-dimensional arrays of data, especially for correlation-based pattern recognition, see for example: Rhodes, W. T., "Acousto-optic signal processing: convolution and correlation", Proc. IEEE, Vol. 69, No. 1, pp. 65-78 (January 1981) and Vander Lugt, A., "Signal detection by complex spatial filtering", IEEE Trans. Inf. Theory IT-10, (2), pp. 139-145 (1964). In addition, the latest generation of optical devices provides the opportunity to construct processors ideally suited for the embedded computer environment because of their potential size, weight and power consumption advantages. See, for example: Stalker, K. T. et al., "A compact, real-time acousto-optic synthetic aperture radar image processor", Proc. SPIE (1989) (SPIE 1989 Technical Symposium, Orlando, Fla., March 1989).

However, optical correlator architectures are not able to achieve the required precision because of the inherent limitations in the dynamic range of available photodetecting devices. If an optical correlator were used for computing each of the signal-dependent terms in equation (2) above, the Lo-bits of dynamic range, which is typical for many CCD (charge-coupled device) photodetectors, would not be sufficient to obtain an accurate result. For example, when an exact template match is found in the input image, the result of the three correlation operations in equation (2) produces three relatively large numbers that, when subtracted, give a zero result. Since after this subtraction the concern will be with relatively small numbers, the correlation terms must keep a high degree of precision in order to preserve the integrity of the lower-order bits. Present detectors fall far short of the 28-bits of needed dynamic range. Thus, optical processing architectures have not proven satisfactory for this task, and the need has remained for a more suitable means for discriminating patterns from gray-level input images.

The mean-square-error (MSE) correlation algorithm has been implemented for many years on large electronic computers to recognize objects of interest in gray-level input scenes and can also provide enhanced performance over correlators for discriminating object image features in gray-level input scenes and in input images having high average background values.

The two-dimensional MSE pattern recognition algorithm for an input image $I(x,y)$ having a size of $N \times N$, and a reference template $R(x,y)$ having a size of $M \times M$ is given as follows:

$$MSE = \Sigma[I - R]^2 \qquad (3)$$

and can be evaluated for $MSE(n_x, n_y)$ which is given by:

$$MSE(n_x, n_y) = \sum_{n_y=0}^{N-M-1} \sum_{n_x=0}^{N-M-1} \left( \sum_{m_y=0}^{M-1} \sum_{m_x=0}^{M-1} [I(n_x + m_x, n_y + n_x) - R(m_x, m_y)]^2 \right) \qquad (4)$$

so that $MSE(n_x, n_y)$ can be further expressed as:

$$MSE(n_x, n_y) = \sum_{n_y} \sum_{n_x} \left( \sum_{m_y} \sum_{m_x} [I^2 + R^2 - 2IR] \right) \qquad (4)$$

where the third term ($\Sigma\Sigma 2\ I\ R$) in equation (5) is the correlation of the input image $I(x,y)$ with the reference template $R(x,y)$ times a constant, the second term ($R^2$) is a constant term for each template, and the first term ($I^2$) is the correlation of the input image squared with a constant unity template.

Because of the large amount of image data which must necessarily be processed in performing the computations involved in implementing the MSE algorithm on even the smallest input reference image templates, such previous implementations must use floating point arithmetic in order to keep track of the result with the necessary precision required. However, presently available electronic processors using floating point arithmetic are not able to attain the high throughput rates necessary for processing input image data in "virtual" real-time mode.

In accordance with the present invention, it is now made possible to perform the MSE operation in one step using a modified optical correlator implementation. This implementation overcomes the serious dynamic range problems encountered by forming the result as the difference of correlation products.

By way of introduction, it is helpful to first briefly describe an implementation of the DSE algorithm on an optical architecture. The basic element needed for computing the difference-squared error is the time-integrating optical correlator. A one-dimensional (1—D) correlation between a reference template, $R(t)$, and an input signal, $I(t)$, is defined by:

$$C(\tau) = \int_T R(t)\, I(t+\tau) dt \qquad (6)$$

where T is the duration of the reference signal. This can be implemented in an acousto-optic architecture as shown in FIG. 2 [see also: Psaltis, D., "Two-dimensional optical processing using one-dimensional input devices," Proc. IEEE 72(7), pp. 962-974, (1984), and Kellman, "Time Integrating Optical Signal Processing", pp. 51-55, (Ph. D. Thesis), Stanford University (1979).

In the architecture of FIG. 2, the intensity of the diode light source D is temporally modulated. The light from the diode D is collimated by the first lens L1 and illuminates the aperture of the acousto-optic device AOD. The electrical signal I(t) is mixed to the center frequency of the cell and applied to the input transducer of the AOD where it is converted into a time-delayed spatial modulation. The carrier offset causes the diffracted order to contain the desired signal, $I(t+\tau)$. In this form, $\tau = x/v$ where v is the speed of sound in the cell and x is the dimension in the direction of acoustic propagation. The undiffracted light is blocked by a D. C. stop S. The spatial distribution is then imaged onto a detector plane of a detector array A (e.g., a CCD). If the diode D is driven by a time-varying signal R(t) as the information I(t) propagates down the length of the AOD, then the charge accumulated on the detector array A will be proportional to the correlation of the two signals R(t) and I(t). This one-dimensional time integrating optical correlator uses incoherent light, and therefore only positive real values can be represented. To overcome this limitation, signals are placed on a bias. This bias causes cross-correlation products to appear in the correlation result thereby degrading the peak-to-sidelobe ratio of the correlation peak as has been shown from Molley, P. A., et al., "A high dynamic range acousto-optic image correlator for real time pattern recognition," Proc. SPIE, Vol. 938, pp. 55-65 (1988).

However, it has been found that these same bias terms can be beneficial for forming the difference-squared error result, if the form of the input signals is modified. An implementation of the DSE algorithm on an optical architecture is described in Molley, P. A., "Implementing the difference-square error algorithm using an acousto-optic processor," SPIE Vol. 1098, pp. 232-239, (1989) (SPIE 1989 Technical Symposium, Orlando, Fla., March 1989), the substance of which is hereby incorporated herein by reference thereto.

A real-time incoherent light optical image correlator also has been described using an acousto-optic device and an array of light-emitting diodes as electronic-to-optical transducers for the input and reference images, respectively, in an optical correlator architecture, with a two-dimensional correlation being formed by temporal integration on a two-dimensional CCD detector array. See, Psaltis, "Incoherent electro-optic image correlator," Optical Engineering, Vol. 23, No. 1, pp. 12-15, (1984), the disclosure of which is hereby incorporated by reference thereto.

In accordance with the present invention, it has now been made possible to implement the MSE algorithm on an optical architecture in order to obtain real-time MSE processing for pattern recognition. This is most desirable from a performance standpoint, in that the MSE algorithm is a very powerful and accurate means of discriminating patterns for locating objects in gray-level input images, providing results which are at least equivalent to those obtained with the DSE algorithm.

In order to demonstrate the feasibility of such an optical architecture for implementing the MSE algorithm, a one-dimensional timeintegrating optical correlator was constructed for implementing the MSE algorithm in an optical correlator architecture. By selectively and specifically modifying the signals applied to the diode light source and the acousto-optic deflector as will be more fully described in detail below, it is made possible to implement the MSE algorithm in real-time using an acoustooptic processor. The implementation makes maximum use of the available dynamic range of the CCD because the contribution of bias terms resulting during the processing operation is utilized as desirable terms for implementing the MSE algorithm. These bias terms produce a charge on the CCD from which the correlation term is subtracted.

Furthermore, by employing "anti-blooming" gates on the CCD detector, the dynamic range of the CCD can be utilized in the range of the expected result, and since the desired result occurs as the lowest (i.e., least charge) value, the dynamic range of the CCD detector may conveniently be fixed to this value. The various system parameters, such as the relative diode intensity, can be set to allow the expected result to fall within the dynamic range of the CCD detector. And by setting the desired result to be a low value, it is possible to ignore any large cross-correlation products which may saturate individual pixel elements of the CCD detector. Computer simulations of pattern recognition processes have indicated that the MSE algorithm correlation technique results exactly match those obtained with the DSE algorithm, with the results obtained by both the DSE algorithm and the MSE algorithm techniques being far superior to the correlation method when certain types of noise and background clutter are present in the input image. The results of these simulations are more fully described below.

Electro-optical devices of the "matched filtering" type are known which make use of optical filters having mean-square error characteristics for providing a desired optical transfer function, for example from U.S. Pat. No. 3,947,123 which discloses the provision and use of an optical filter having minimum mean-square error linear characteristics in a coherent optical analyzer for identifying biological cells, and from U.S. Pat. No. 4,067,645 which discloses forming a minimum mean-square error linear filter photographically. Also known is U.S. Pat. No. 4,082,431 which discloses an image processing system using incoherent radiation and a spatial hologram filter having a linear minimum mean-square error response and the use of such a system for pattern recognition by matched filtering of input images.

However, there have been no previous proposals for implementing the mean square-error (MSE) correlation algorithm in real-time using an optical architecture or an acousto-optical architecture as in the present invention.

It is therefore an object of the present invention to provide an optical correlator architecture implementing the MSE algorithm for pattern recognition which is amenable to construction in a compact, light-weight, low power configuration and which lends itself to the embedded computer environment.

It is further an object of the present invention to provide an implementation of the MSE algorithm using an optical time-integrating correlator for pattern recognition in gray-level input images.

It is still further an object of the present invention to provide an implementation of the MSE algorithm on an optical architecture for processing an input image in one pass in real time.

It is still another object of the present invention to provide an implementation of the MSE algorithm on an optical architecture which can be used for two-dimensional pattern recognition.

It is yet further an object of the present invention to implement the MSE algorithm on an optical architecture making maximum use of the available dynamic range of a CCD photodetector.

The features, objects and advantages of the present invention will be made more apparent from the following detailed description taken together with the accompanying drawings.

DETAILED DESCRIPTION OF THE INVENTION

Figure 1:
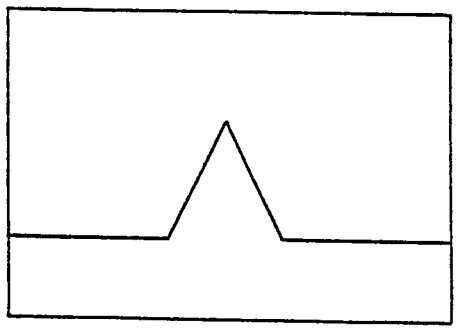
FIGS. 1(a) and 1(b), 1(c) and 1(d), and 1(e) and 1(f) are graphical representations of input signals, correlation results thereon, and difference squared-error results thereon, respectively.
Figure 1:
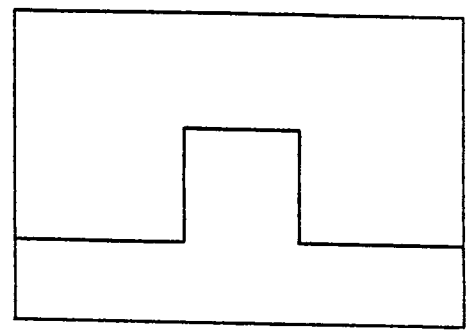
Figure 1:
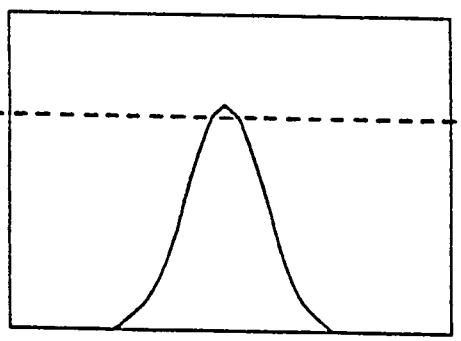
Figure 1:
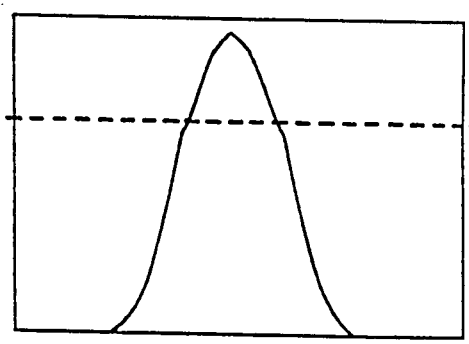
Figure 1:
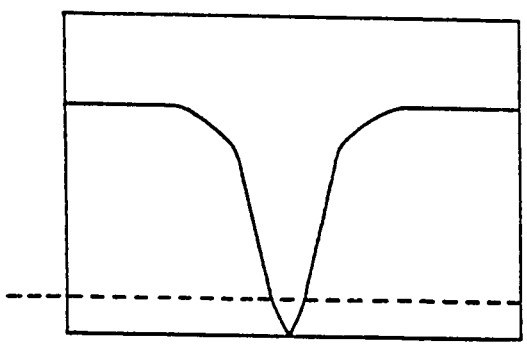
Figure 1:
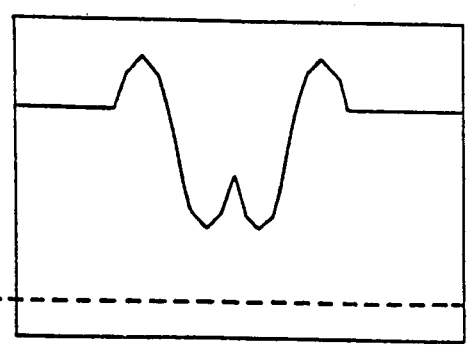
Figure 2:
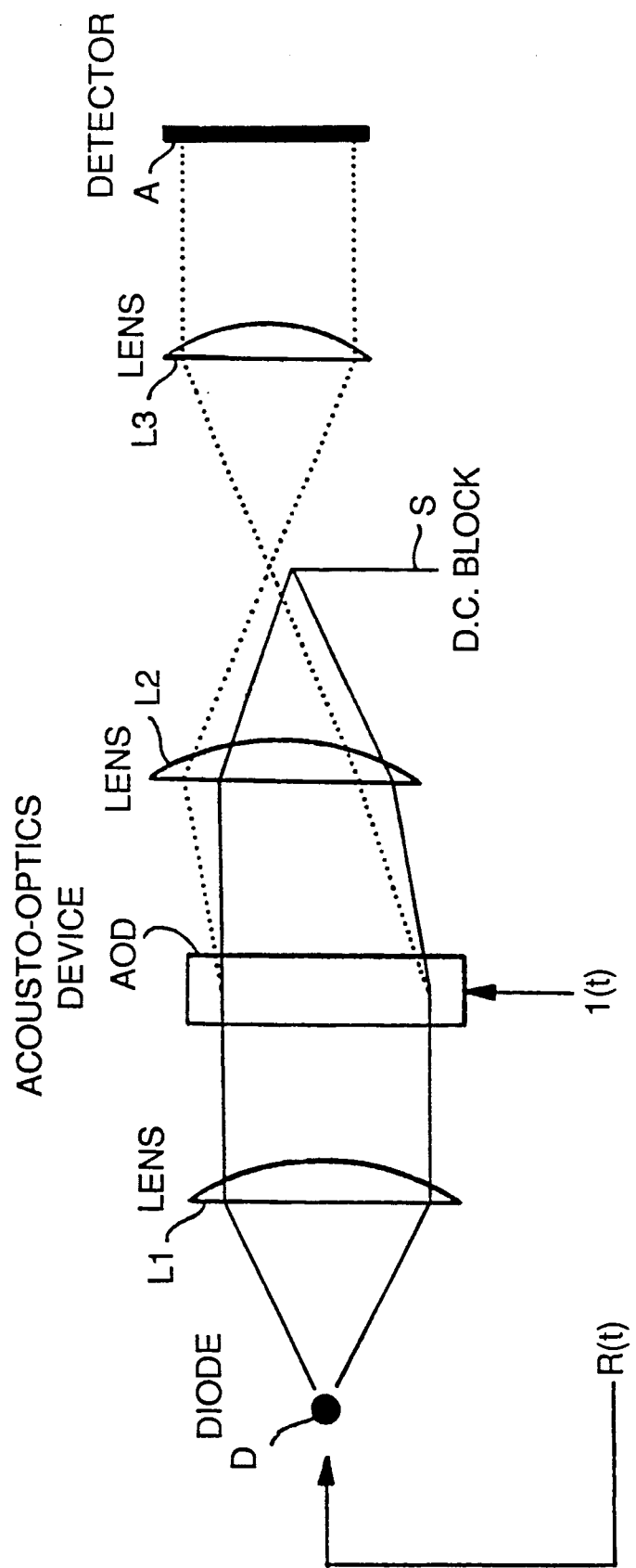
FIG. 2 is a diagram depicting the basic elements of a known time-integrating one-dimensional acousto-optical correlator architecture.
Figure 3A:
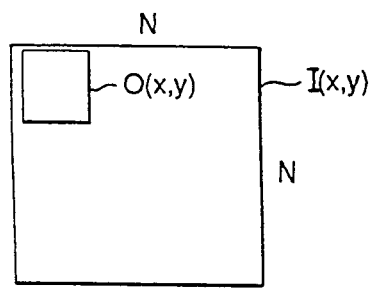
FIGS. 3(a) and 3(b) show an input image and a reference template, respectively.
Figure 3B:
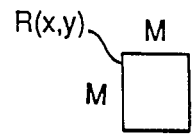

Depicted in FIG. 3(a) is an input image I(x,y) measuring N×N in size, and a reference template R(x,y) measuring M×M in size (N>M) is depicted in FIG. 3(b). As depicted, the input image I contains an object O at the upper left which matches the template.

Figure 4A:
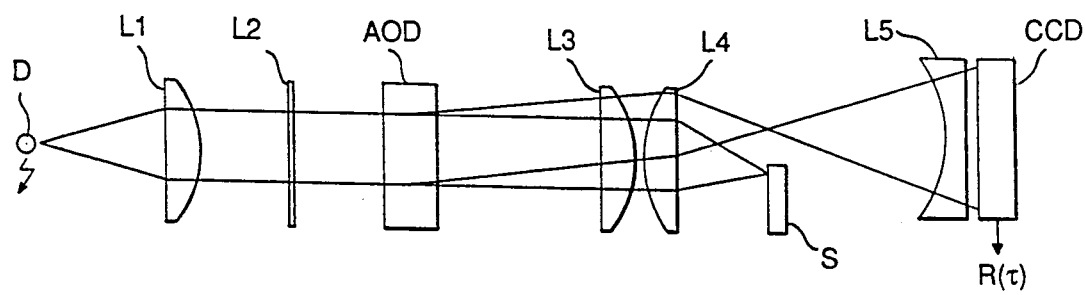
FIGS. 4(a) and 4(b) are respective top view and side view schematic diagrams depicting the basic elements of a two-dimensional time-integrating acousto-optical correlator architecture of the present invention for implementing the mean-square error pattern recognition algorithm.
Figure 4B:
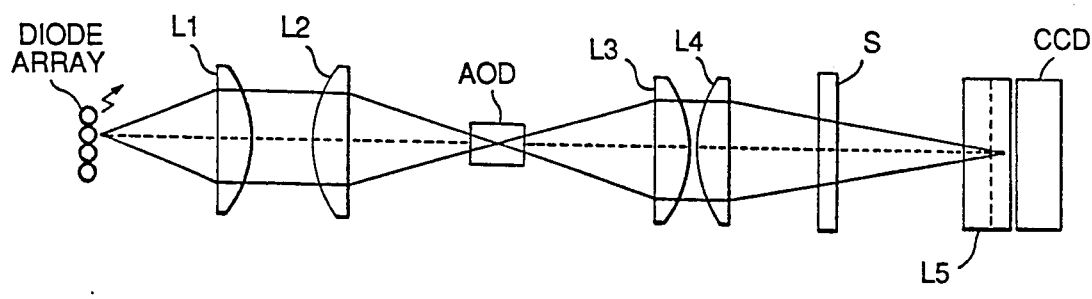

Referring now to FIGS. 4(a) and 4(b), there is shown a timeintegrating optical correlator architecture for implementing the MSE algorithm. A diode light source D is temporally modulated by an electrical signal $I_1(t)$, and the light from the diode source D is expanded and collimated by a pair of lenses L1 and L2 to illuminate the aperture of an acousto-optic deflector AOD at the Bragg angle. An electrical signal $I_2(t)$ is mixed to the center frequency of the cell and applied to the input transducer of the AOD where it is converted into a time-delayed spatial modulation. The light propagating through the AOD is diffracted therein by the applied modulation signal $I_2(t)$, and the diffracted light from the AOD is imaged by lenses L3 and L4 and by a field flattener lens L5 onto a CCD detector array positioned at the output plane. The undiffracted light is blocked from reaching the detector by a D. C. stop S. The +1 diffraction order is passed by the imaging optics.

The diode source D and the acoustic-optic deflector AOD are driven by modulation signals $I_1(t)$ and $I_2(t)$, respectively. A reference oscillator signal is added to the AOD deflection input with a frequency that is offset from the signal modulation. Additionally, the diode light source is modulated on a carrier with the same frequency offset, and the MSE correlation result is formed on the time-integrating CCD detector array operated in the time-delay-and-integrate (TDI) mode. From Kellman, supra at pp. 51-55, it is known that for double sideband modulation the resulting image intensity distribution I incident on the detector CCD is the product of the source modulation and the acousto-optic modulation, given by the following expression:

$$I(t,x) = I_1(t) I_2(t - x/v) \quad (7)$$

where the first term, $I_1(t)$, is the diode source modulation and the second term, $I_2(t - x/v) = |E|^2$, is the acousto-optic modulation.

Figure 5A:
FIGS. 5(a), 5(b) and 5(c) show a modulation signal source for the diode light source of the optical correlator architecture of FIG. 4, and the spectrum characteristics of the input signal applied to the diode modulation signal source and of the diode light source modulation of the architecture of FIG. 4, respectively.

The acousto-optic deflector and the diode light source must be modulated on a carrier with the same frequency offset. FIG. 5(a) shows the diode modulation source (e.g., a product modulator), in which the input information signal $s_1(t)$ is modulated on an offset frequency carrier signal $f_o$ and a constant bias signal $a_o$ is added to this signal to output the resultant diode source modulation signal $I_1(t)$.

Figure 5B:
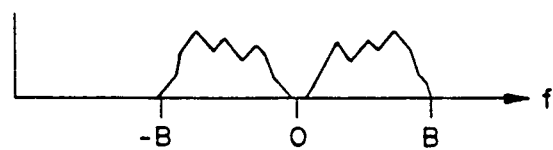
Figure 5C:
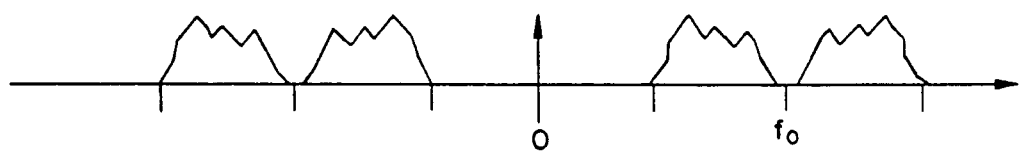

FIG. 5(b) depicts the spectrum of the information signal $s_{(f)}$ input to the diode modulation source, and FIG. 5(c) depicts the spectrum of the diode source modulation signal $I_1(t)$.

Figure 6A:
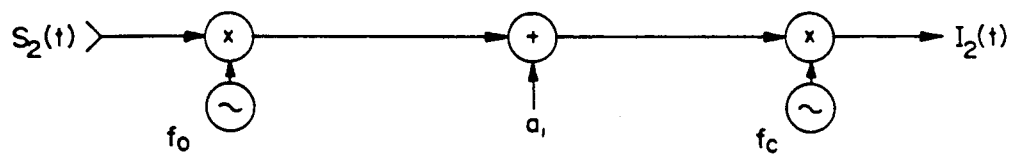
FIGS. 6(a) and 6(b) show a modulation signal source for the acousto-optic deflector in the optical correlator architecture of FIG. 4 and the modulation spectrum characteristics of the acousto-optic deflector modulation, respectively.
Figure 6B:
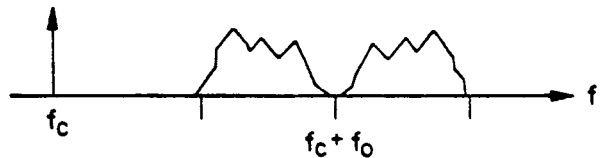

FIG. 6(a) shows the acousto-optic deflector modulation source (e.g., a dual product modulator) and FIG. 6(b) depicts the spectrum of the acoustooptic deflector modulation signal $I_2(t)$ for double-sideband suppressed-carrier (DSB-SC) modulation. In the AOD modulation source, a reference oscillator frequency signal $f_o$ is modulated to the AOD input signal $s_2(t)$ with a frequency that is offset from the signal modulation. This resultant product is then subtracted from a constant bias signal $a_1$ and finally modulated to the center frequency of the acousto-optic device $f_c$ producing the output $I_2(t)$.

For double-sideband modulation, the resultant light intensity incident on the CCD due to the diode source modulation $I_1(t)$ is given by:

$$I_1(t) = A_1[1 + \sqrt{2} m_1 s_1(t)\cos(2\pi f_o t)] \tag{8}$$

where $f_o$ is the frequency offset between the reference oscillator at $f_c$ and the DSB-SC modulation at $f_c + f_o$ and the amplitude transmittance of the $+1$ diffracted order from the acousto-optic deflector modulation due to the input signal $s_2(t)$ is given by:

$$E_2(t) \doteq \sqrt{A_2}[1 + \sqrt{2} m_2 s_2(t)\cos(2\pi f_o(t))] \cdot e^{j2\pi f_c t} \tag{9}$$

so that the intensity transmittance due to the AOD modulation signal $I_2(t)$ is therefore given by:

$$I_2(t) = |E_2(t)|^2 \tag{10}$$

$$= A_2[1 + 2 m_2^2 s_2^2(t) + 2\sqrt{2}\, m_2 s_2(t)\cos(2\pi f_o t)] \tag{11}$$

where:
$s_1(t)$ is the signal input to the diode modulation source;
$s_2(t)$ is the signal input to the AOD modulation source;
$A_1$ is the light intensity;
$A_2$ is the diffraction efficiency;
$m_1$ and $m_2$ are constants that determine the signal-to-bias ratio;
$f_o$ is the frequency offset between the reference oscillator at $f_c$ and the DSB-SC modulation at $f_c + f_o$; and
$a_o$ and $a_1$ are constants chosen to bias the diode source and the acousto-optic deflector into their respective linear operating regions so that the diode source exhibits a linear intensity characteristic and the AOD exhibits a linear amplitude characteristic.

If the signals $s_1$ and $s_2$ are bandlimited to a bandwidth B such that $|s(f)| = 0$ for $|f| > B$, and have unit variance, then the source intensity and the acoustic modulation have respective variances of $m_1^2$ and $m_2^2$ and the diode source with modulation depth m is limited to $\pm m/m_1$ standard deviations of the input signal.

The correlator output result, $R(\tau)$, where $\tau = x/v$, is as follows:

$$R(\tau) = \int T I_1(t) I_2(t-\tau) dt \tag{12}$$

Time-integration on the CCD detector produces six cross-correlation products which can be expressed by equation (13) as follows:

$$R(\tau) = \tag{13}$$

$$A_1 A_2 \{\int dt + 2 m_2^2 \int s_2^2(t-\tau) dt +$$
(i) (ii)

$$2\sqrt{2}\, m_2 \int s_2(t-\tau)\cos[2\pi f_o(t-\tau)] dt +$$
(iii)

$$\sqrt{2}\, m_1 \int s_1(t)\cos[2\pi f_o t] dt +$$
(iv)

$$2\sqrt{2}\, m_1 m_2 \int s_1(t) s_2^2(t-\tau)\cos[2\pi f_o t] dt +$$
(v)

$$4 m_1 m_2 \int s_1(t) s_2(t-\tau)\cos[2\pi f_o t]\cos[2\pi f_o(t-\tau)] dt\}$$
(vi)

For $f_o$ chosen sufficiently higher than the bandwidth B of the input signals, i.e., where $f_o > 3B$, the third, fourth and fifth cross terms (iii, iv and v) in equation (13) effectively integrate to zero, leaving only three remaining terms:

$$R(\tau) = \tag{14}$$

$$A_1 A_2 \{T + 2 m_2^2 \int s_2^2(t-\tau) dt +$$
(i) (ii)

$$2 m_1 m_2 \cos[2\pi f_o \tau] \int s_1(t) s_2(t-\tau) dt\}$$
(iii)

The first term (i) in equation (14) represents a constant bias, and the second term (ii) represents signal-dependent bias. The third term (iii) in equation (14) is the desired correlation. Comparing the correlation term on the right side of equation (5) above with the terms (i – iii) on the right side of equation (14) rewritten so as to represent the constant terms in equation (14) by $K_1$ and $K_2$ several things become apparent:

from equation (5)

$$\Sigma\Sigma[R^2 + I^2 - 2IR] \tag{5a}$$

from equation (14):

$$A_1 A_2 [T + K_1 \int s_2^2 dt + K_2 \int s_1 s_2 dt] \tag{14a}$$

The first terms in each of expressions (5a) and (14a) are constant (known a prior) values. The second terms in each expression represent the input signal squared integrated over a unity reference template. And the third terms in each expression represent the correlation of the input image and the reference template. Since the constants $K_1$ and $K_2$ are a function of $m_1$ and $m_2$, values which are input signal-dependent (i.e., they are both constant with respect to the input signal) and which can thus be selected from setting the proper input levels, the magnitude of these last two terms can be made equal.

In order to model the MSE correlation term from equation (5) using an optical processor which produces the results depicted by equation (14), it is necessary to change the sign of the third term in equation (14). This can be accomplished by altering the phase of the offset frequency, $f_o$ and modulating the information signal driving the acousto-optic deflector AOD by 180°. This results in the acousto-optic modulation taking the following form:

$$E_2(t) + \sqrt{A_2}[1 - \sqrt{2} m_2 s_2(t)\cos(2\pi f_o t)] \cdot e^{j2\pi f_c t} \tag{15}$$

giving the intensity transmittance:

$$I_2(t) = A_2[1 + 2 m_2^2 s_2^2(t) - 2\sqrt{2} m_2 s_2(t)\cos(2\pi f_o t)] \tag{16}$$

The correlator results will then take the following form:

$$R(\tau) = A_1 A_2 \{T + 2m_2{}^2 \int s_2{}^2(t-\tau)dt - \qquad (17)$$
$$2m_1 m_2 \cos[2\pi f_o \tau] \int s_1(t) s_2(t-\tau)dt\}$$

A second way of producing a negative sign (−) in the expression for $E_2(t)$ (cf. equations 9 and 15) is as follows: $s_2(t)$ is composed of a D. C. component, $D_1$ and a signal component, g(t). That is, $$s_2(t) = D_1 + g(t) \qquad (18)$$

By subtracting off the D. C. component $D_1$, inverting the signal g(t), and then adding a D. C. component $D_2$ back in, it is possible to produce the desired signal with a slightly different D. C. component:

$$g(t) = s_2(t) - D_1 \qquad (19)$$

$$-g(t) = -s_2(t) + D_1 \qquad (20)$$

$$D_2 - g(t) = -s_2(t) + D_1 + D_2 \qquad (21)$$

This result means that the mean-square-error (MSE) algorithm can be implemented using an acousto-optic processor. This implementation of the MSE algorithm on an acousto-optical architecture can compute the result using one correlation pass with a minimization of unwanted bias terms. Furthermore, these bias terms can be computed a priori.

This implementation of the MSE algorithm can also be applied to two-dimensional optical architectures using one-dimensional devices such as the optical architecture described in Psaltis, D., "Incoherent electro-optic image correlator," Optical Engineering, Vol. 23, No. 1, pp. 12-15, (1984). Each line of a reference signal is accessed separately, in parallel, and is used to modulate temporally a corresponding element of a one-dimensional LED array. A correlation between each of the signals applied to the LED array and an input image signal applied to the AOD is formed on a two-dimensional CCD detector array.

The implementation of the present invention makes maximum use of the available dynamic range of the CCD detector since the bias terms' contributions are part of the desired terms for computing the mean-square-error algorithm and they produce charge on the detector from which the correlation term is ultimately subtracted.

In present implementation, by optically computing the entire mean-square error operation in one correlation pass, the objects of interest in the input image being processed will always produce small values at the output, while all other items in the input image scene such as background and clutter features will generate very high values at the output. By choosing the intensity levels of the input signals by setting appropriate values $A_1$ and $A_2$ in equations (15) and (16), the output intensity level can be selected. This intensity level should be set so that low MSE output values which occur when an approximate match has been located are within the dynamic range of the CCD detector. In this way the limited detector dynamic range can be used for discriminating against targets which may closely resemble the object of interest.

Furthermore, by making use of anti-blooming gates incorporated with the detector elements on the CCD detector, the dynamic range of the CCD can be utilized in the range of the expected result. Since the desired result occurs as the lowest (i.e., least charge) value on the CCD, the dynamic range of the CCD should be fixed to detect this value. The various system parameters, such as the relative diode intensity $A_1$, can be set to allow the expected result to fall within the desired dynamic range of the CCD. Large cross-correlation products will saturate the individual pixels of the CCD; however, these results will be ignored anyway if the desired result is a low value as made possible by implementing the MSE algorithm.

Figure 7:
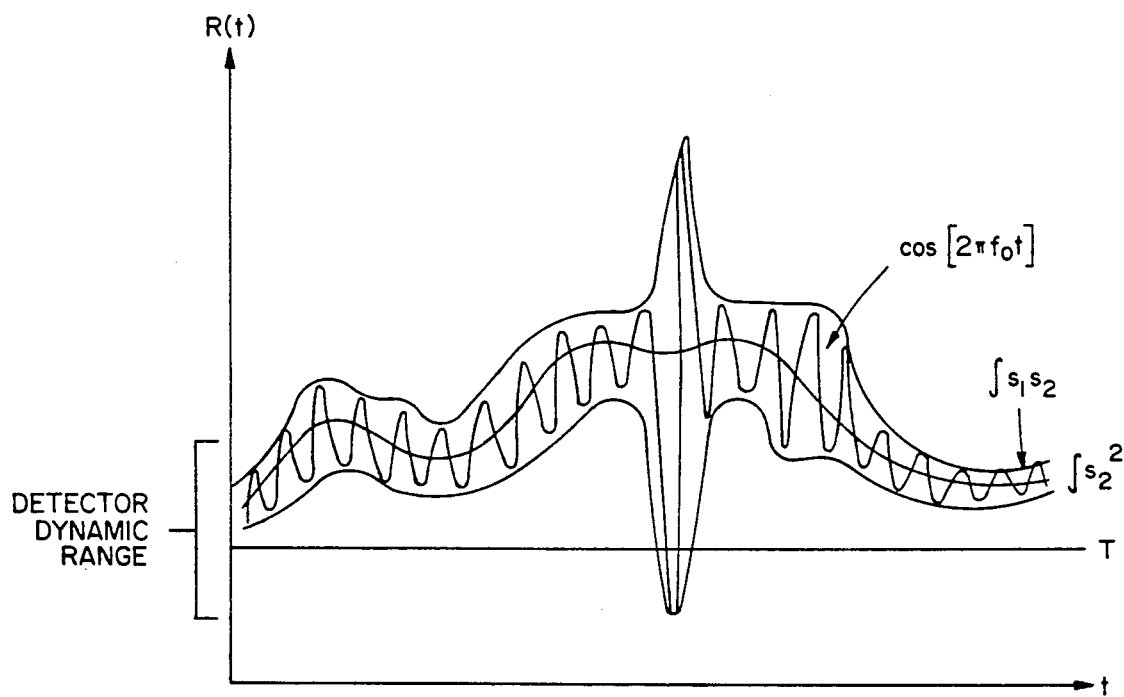
FIG. 7 is a diagram depicting the mean-square-error algorithm correlation result R(T) and the various components thereof.

FIG. 7 depicts the MSE algorithm correlation result $R(\tau)$ and various components thereof corresponding to the terms in equation (17). In order to detect the variations of the carrier term, $\cos[2\pi f_o \tau]$, a greater number of pixels will be required in the CCD. The incorporation of anti-blooming gates with the detector elements of the CCD can prevent the saturated detector wells, i.e., due to large cross-correlation products, from interfering with data in adjacent detector wells. By setting the desired result, $R(\tau)$, to fall within the dynamic range of the CCD detector as shown, decision logic can be provided at the output of the optical MSE algorithm correlator's detector to evaluate the correlation result. For example, a simple threshold gate can then detect the output values below a certain programmable threshold level T indicating an approximate match.

Next there will be described experimental results obtained with the optical architecture for implementing the MSE algorithm as shown in FIG. 7.

Figure 8:
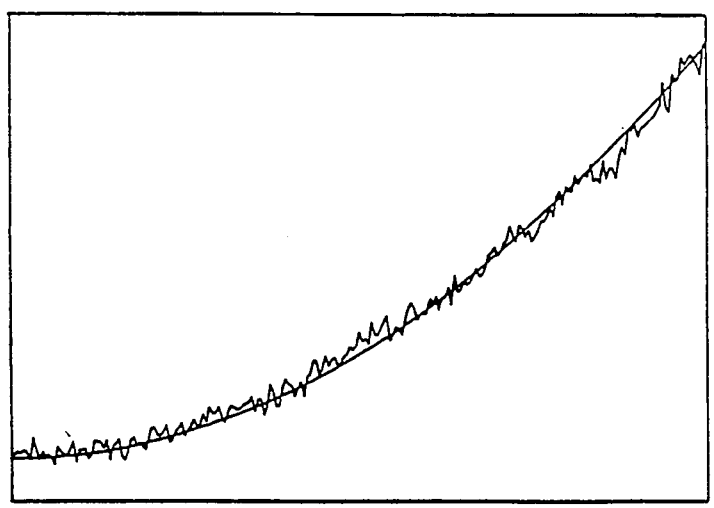
FIG. 8 is a plot of the resulting intensity on the CCD in an evaluation of the optical architecture of the present invention.

An AOD input signal $I_2(t)$ in the form of a linear ramp modulated on a 51 MHz carrier was generated. A laser diode used as the diode source D was pulsed at a very short pulse width in order to freeze the data in the AOD (e.g., ~40 ns). FIG. 8 shows a plot of the resulting intensity on the CCD, which is superimposed for comparison purposes with a computer-generated $x^2$ function plot. This squaring function of the resulting intensity on the CCD as shown in FIG. 8 is necessary for implementing the mean-square-error algorithm.

Figure 9A:
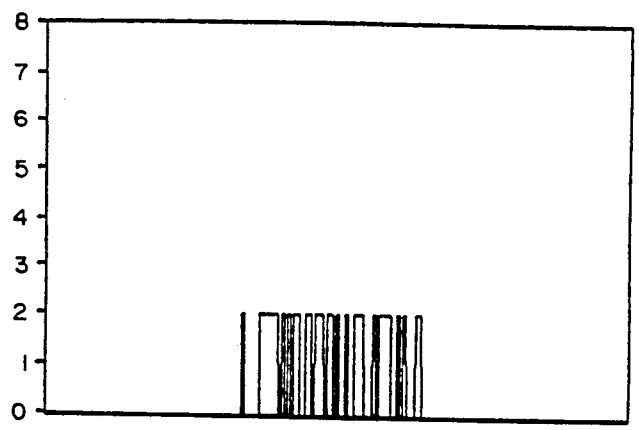
FIGS. 9(a) through 9(c) show respective input data sets.
Figure 10:
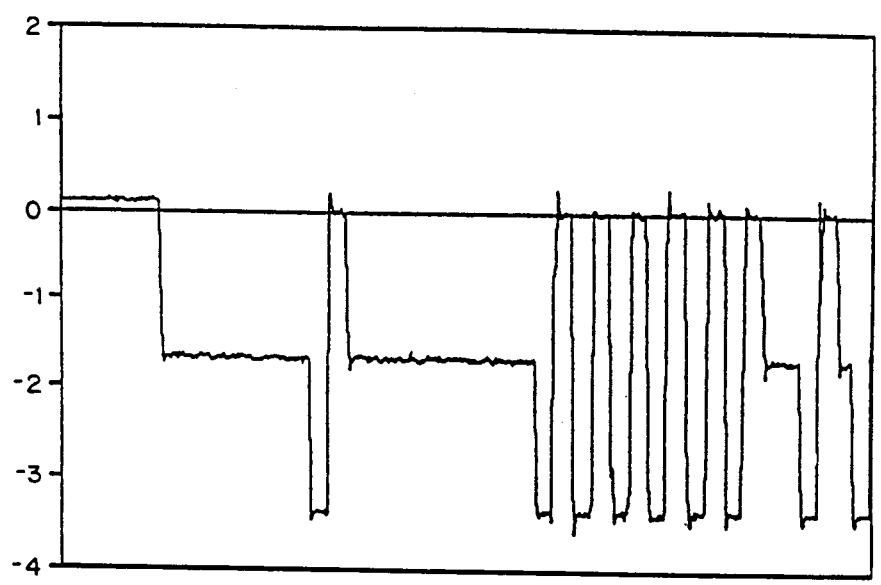
FIG. 10 shows a data stream driving the acousto-optic device.

Next, data for a 63-bit code input as shown in FIG. 9(a) was modulated on a carrier and set on a bias. The start of this modulated data stream used to drive the laser diode source is shown in FIG. 10. The negative voltage levels turn the laser diode "on" while the zero voltage level turns the laser diode "off".

Input data #1 shown in FIG. 9(a) was used to generate data for the AOD modulation of the form:

$$AOD \text{ input} = [1 - f(t)] \sin(2\pi f_o t) \qquad (22)$$

Figure 11:
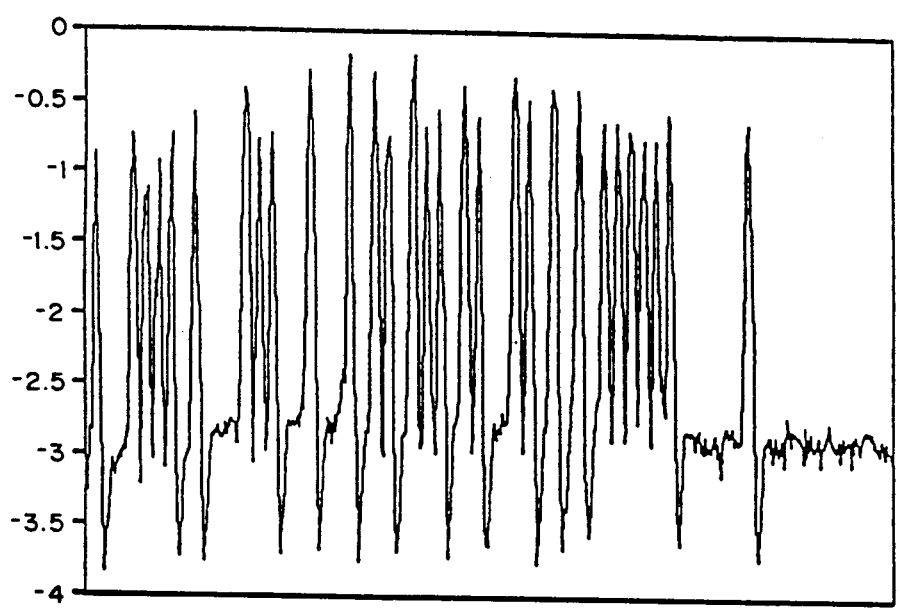
FIG. 11 shows the resulting intensity on the CCD from the data set of FIG. 10.

The frequency $f_o$ was chosen such that there was exactly one cycle of the sine wave input per bit of the input function f(t). The resulting intensity on the CCD, obtained from pulsing the laser diode for a very short time, is shown in FIG. 11, and also exhibits the squaring property of the CCD which is necessary for implementing the mean-square-error algorithm correlation.

Figure 12:
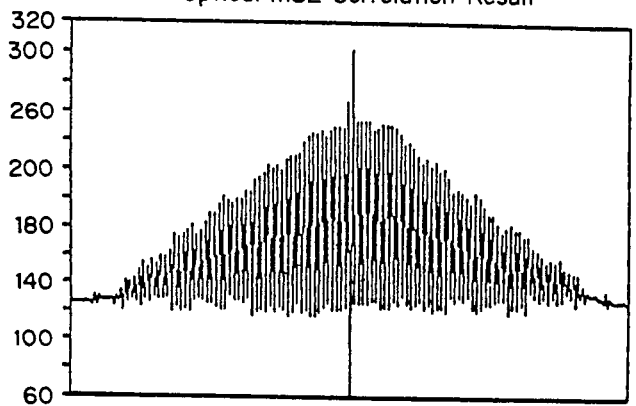
FIG. 12 shows the optical MSE correlator output from the input data set of FIG. 9(a)

The results of the optical MSE correlation operation performed on input data #1 provided at the output of the optical correlator are shown in FIG. 12. This is the output without clipping and without reference carrier substraction for input data #1.

Figure 13A:
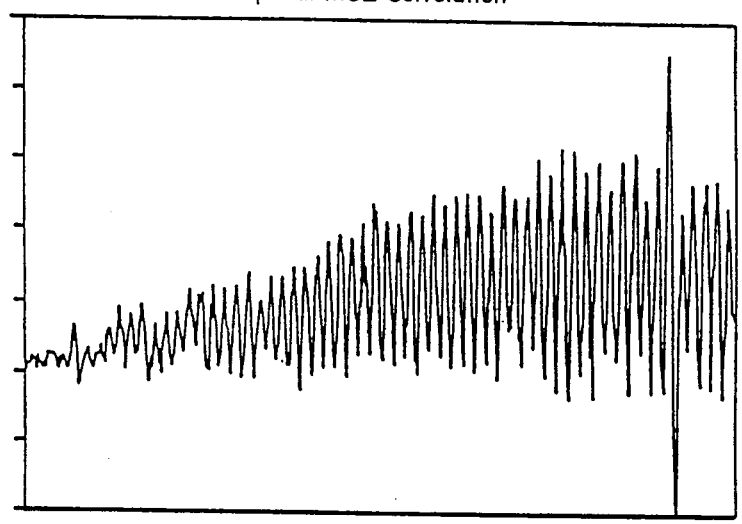
FIGS. 13(a) and 13(b) show the results of an optical MSE correlation and a digital MSE correlation computation performed on the input data of FIG. 9(a), respectively.
Figure 13B:
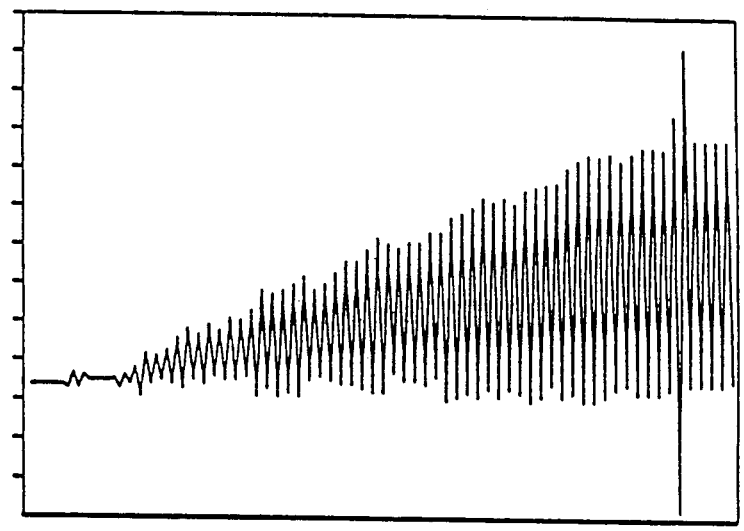

In FIG. 13(b) there is shown the results of a computer-generated MSE correlation simulation (digital MSE correlation) performed on input data #1, while in FIG. 13(a) there is shown for comparison the output of the optical MSE correlator for input data #1. Comparison of the digital MSE correlation output of FIG. 13(a) with the optical MSE correlation output of FIG. 13(b) shows that the optical time-integrating MSE correlator architecture is capable of computing the mean-square-error correlation algorithm to a high degree of accuracy. The differences between the results shown in FIGS. 13(a) and 13(b) can be accounted for by the noise introduced in the CCD detector and the magnification variances introduced by the system optics.

Figure 9B:
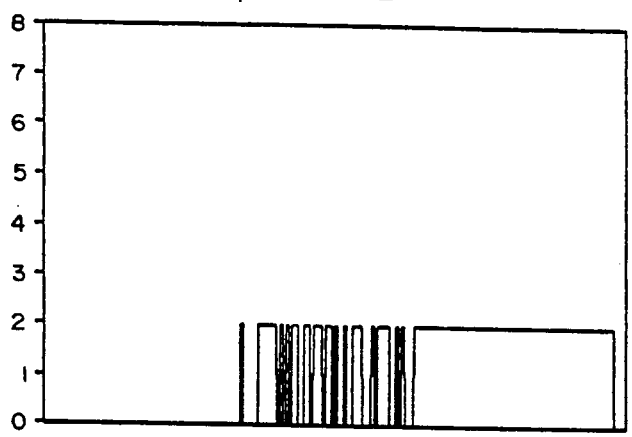
Figure 9C:
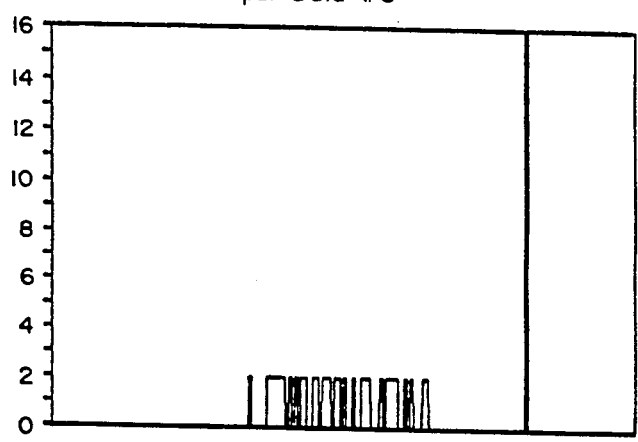
Figure 14A:
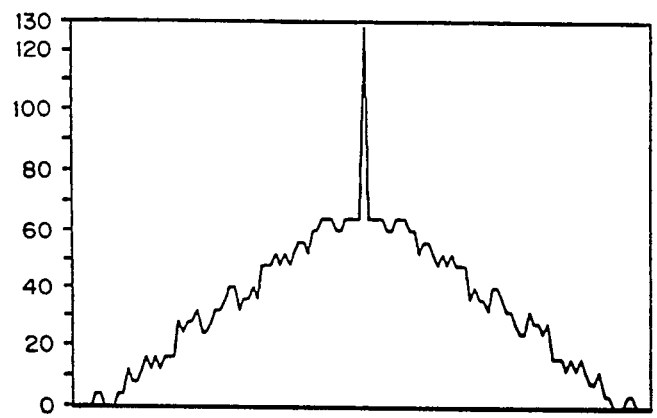
FIGS. 14(a) through 14(c) show the results of computer-simulated correlation operations performed on the input data of FIGS. 9(a) through 9(c)
Figure 14B:
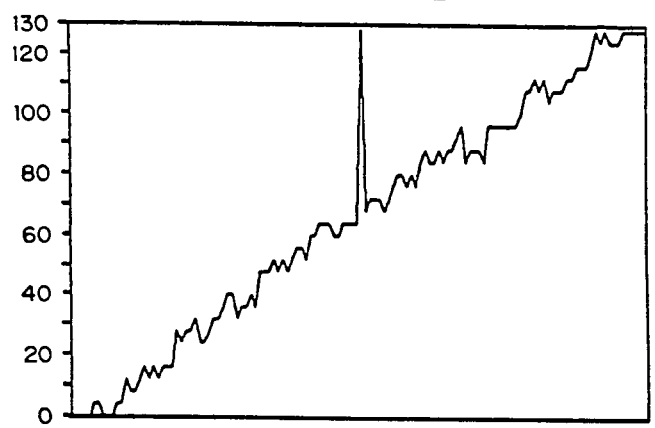
Figure 14C:
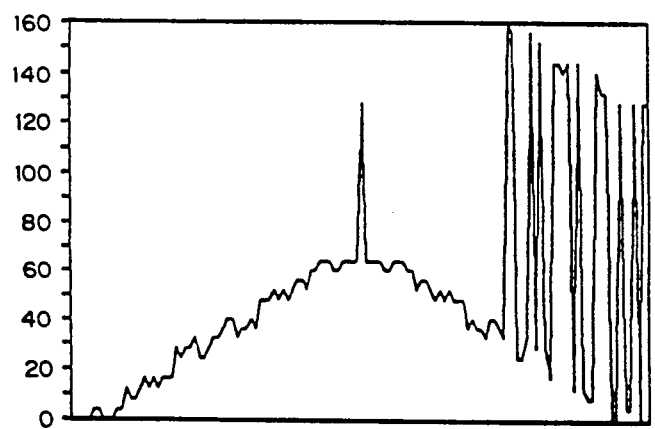
Figure 15A:
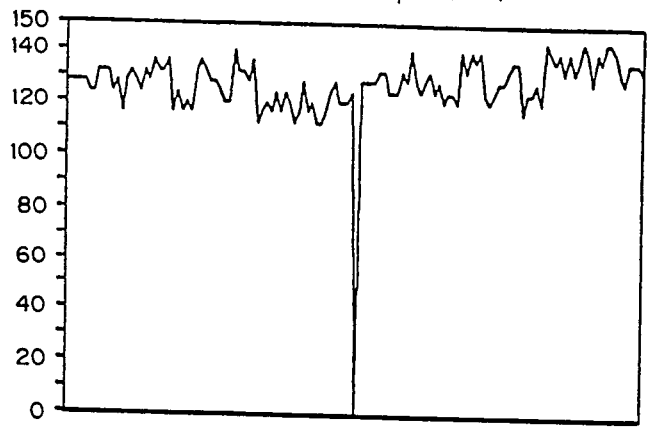
FIGS. 15(a) through 15(c) show the results of computer-simulated DSE correlation operations performed on the input data of FIGS. 9(a) through 9(c)
Figure 15B:
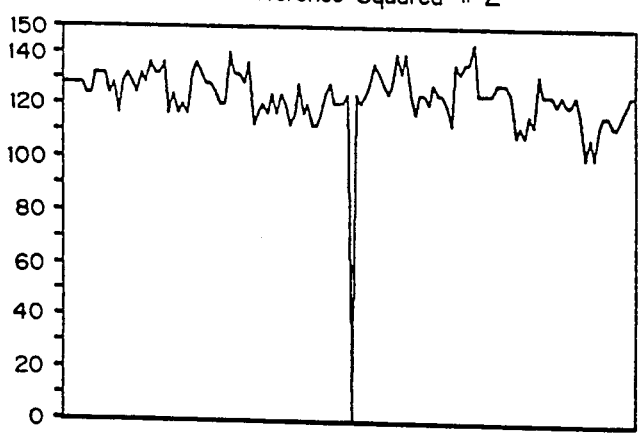
Figure 15C:
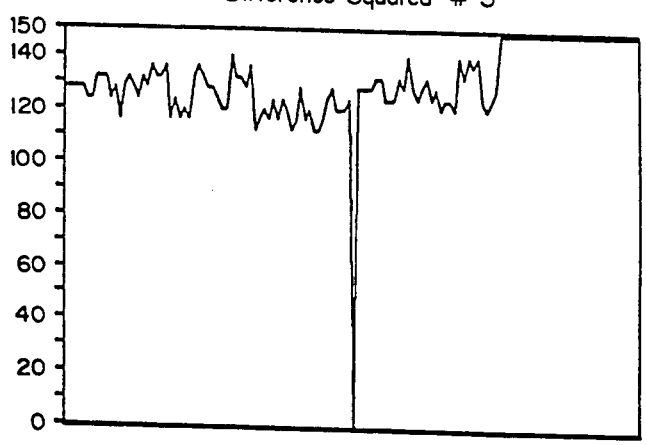
Figure 16A:
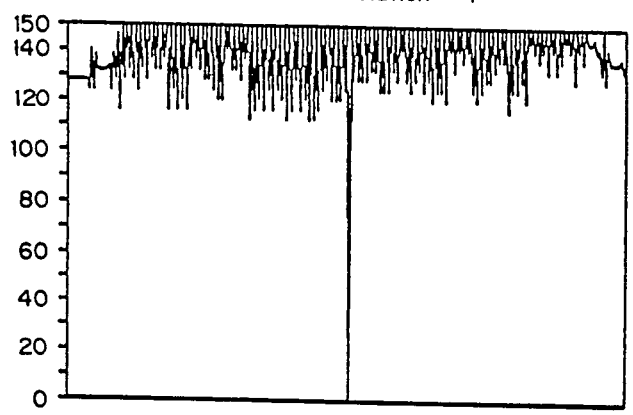
FIGS. 16(a) through 16(c) show the results of computer-simulated MSE correlation operations performed on the input data of FIGS. 9(a) through 9(c).
Figure 16B:
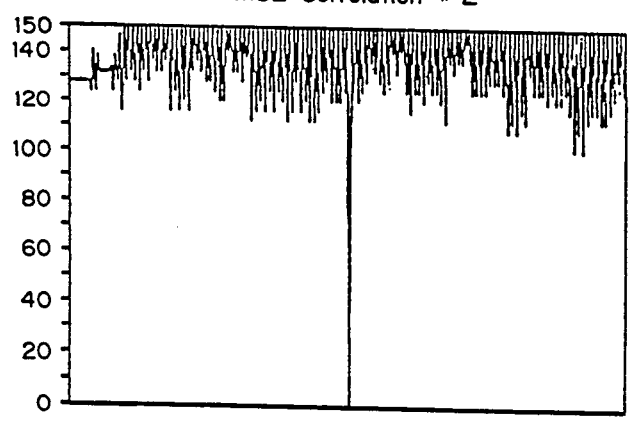
Figure 16C:
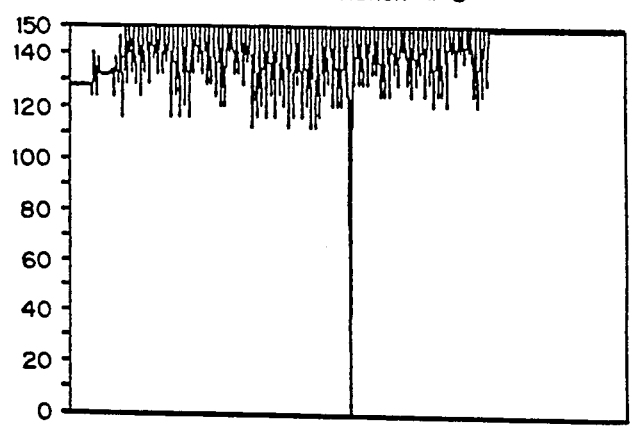

Computer simulations comparing the performance of the MSE correlation algorithm to the basic correlation and difference-squared error correlation algorithms were carried out for each of the input data sets #1, #2 and #3 shown in FIGS. 9(a), 9(b) and 9(c), respectively. The corresponding correlation operation results are shown in FIGS. 14(a) through 14(c), and the corresponding difference-squared error algorithm computation results are shown in FIGS. 15(a) through 15(c). The corresponding mean-square-error algorithm computation results are shown in FIGS. 16(a) through 16(c). The results of these computer simulations show how the difference-squared error algorithm is greatly superior to correlation in pattern recognition when certain types of background noise and clutter are present in the input image, and furthermore show clearly that the mean-square-error algorithm correlation technique exactly matches the results of the difference-squared-error algorithm.

The foregoing description is intended by way of example only and is not intended to limit the present invention in any way except as set forth in the following claims.

What is claimed is:

1. An optical pattern recognition architecture implementing the mean-square-error algorithm, MSE=$\Sigma$-$[I-R]^2$, for discriminating a reference pattern R in an input image I, comprising:

light source means for outputting modulated light in accordance with a light source modulation signal applied to a light source modulation signal input thereof;

optical deflector means for diffracting light incident at an aperture thereof in accordance with an optical deflector modulation signal applied to a signal input thereof for producing a spatial distribution of said incident light;

means for focusing modulated light output by said light source means onto the aperture of said optical deflector means;

means for generating a double-sideband suppressed-carrier amplitude modulated light source modulation signal $I_1(t)$ as the product of a time-varying reference image signal $s_1(t)$ applied thereto and a frequency offset carrier signal $f_o$ and for applying said light source modulation signal $I_1(t)$ to said light source modulation signal input of said light source means for causing said light source means to be temporally modulated in accordance therewith, said light source modulation $I_1(t)$ taking the form:

$$I_1(t) = A_1[1 + \sqrt{2}m_1 s_1(t) \cos(2\pi f_o t)];$$

means for generating a double-sideband suppressed-carrier amplitude modulated optical deflector modulation signal $I_2(t)$ as the product of a time-varying input image signal $s_2(t)$ input thereto and a reference carrier $f_c$ and an offset frequency carrier $f_o$, and for applying said optical deflector modulation signal $I_2(t)$ to said optical deflector modulation signal input of said optical deflector means for causing said modulated light output from said light source means to be diffracted into a time-delayed spatial modulation in accordance therewith, said optical deflector modulation $I_2(t)$ taking the form:

$$I_2(t) = A_2[1 + 2m_2^2 s_2^2(t) - 2\sqrt{2}m_2 s_2(t) \cos(2\pi f_o t)];$$

integrating light detector means having a detection plane for detecting and electronically integrating light incident on said detector plane and for outputting a mean-square-error correlation signal R(t) in correspondence therewith, said mean-square-error correlation signal R($\tau$) taking the form:

$$R(\tau) = A_1 A_2 \{[T] + [2m_2^2 \cdot \int s_2^2(t-\tau)dt] - [2m_1 m_2 \cos[2\pi f_o \tau] \cdot \int s_1(t)s_2(t-\tau)dt]\}$$

such that by adjusting the $m_1$ and $m_2$ for the input modulation, $m_1$ is equal to 2 $m_2$, and a zero value of R($\tau$) represents a match correlation between said input image I and said reference pattern R; and means for imaging the spatially distributed light diffracted by said optical deflector means onto the detector plane of said integrating light detector means;

where:

$s_1(t)$ is the signal input to the light source modulation means;

$s_2(t)$ is the signal input to the optical deflector modulation means;

$A_1$ is the light intensity;

$A_2$ is the diffraction efficiency;

$m_1$ and $m_2$ are constants that determine the signal-to-bias ratio;

$f_o$ is the frequency offset between the reference oscillator at $f_c$ and the DSB-SC modulation at $f_c + f_o$; and $a_o$ and $a_1$ are constants chosen to bias the light source means and the optical deflector into their respective linear operating regions so that the light source means exhibits a linear intensity characteristic and the optical deflector means exhibits a linear amplitude characteristic.

2. An optical pattern recognition architecture according to claim 1, wherein the light source means is at least one laser diode.

3. An optical pattern recognition architecture according to claim 1, wherein the optical deflector means is an acousto-optic deflector.

4. An optical pattern recognition architecture according to claim 1, wherein the means for generating the optical deflector modulation signal $I_2(t)$ alters the phase of the offset frequency $f_o$ by 180°.

5. An optical pattern recognition architecture according to claim 1, wherein the image signal $s_2(t)$ is composed of a first D. C. component $D_1$ and a signal component g(t), and wherein the means for generating the optical deflector modulation signal $I_2(t)$ subtracts said D. C. component $D_1$ from said image signal $s_2(t)$ and adds a second D. C. component $D_2$ to said image signal $s_2(t)$, where $$D_2 - g(t) = -s_2(t) + D_1 + D_2.$$

6. An optical pattern recognition architecture according to claim 1, wherein the integrating light detector means is a CCD photodetector array operated in a time-delay-and-integrate mode.

7. An optical pattern recognition architecture according to claim 6, further comprising decision logic means provided at a correlation signal output of the CCD photodetector for determining whether the value of said mean-square error correlation signal $R(\tau)$ is below a predetermined threshold level corresponding to a desired correlation result between said input image I and said reference image R.

8. An optical pattern recognition architecture according to claim 6, wherein the CCD photodetector is provided with anti-blooming gate means incorporated with photodetector elements of said CCD photodetector for preventing saturated detector wells from interfering with data in adjacent detector wells.

9. An optical pattern recognition architecture according to claim 6, wherein the value of the relative light source intensity $A_1$ is set such that the charge level produced in said CCD photodetector, when said mean-square-error correlation signal $R(\tau)$ assumes a value corresponding to a desired correlation result between said input image I and said reference image R, is within the dynamic range of said CCD photodector.

10. An optical pattern recognition architecture according to claim 6, wherein the CCD photodetector is provided with a sufficient number of pixels for detecting variations in the carrier term, $\cos[2\pi f_o \tau]$, in said mean-square-error correlation signal $R(\tau)$.

11. An optical pattern recognition architecture according to claim 1, wherein the means for imaging the light diffracted by the optical deflector means onto the detector plane of the light detector means includes a field flattener lens provided in front of the detector plane of the integrating light detector means.

12. An optical pattern recognition architecture according to claim 1, further comprising D. C. stop means for blocking undiffracted light from the optical deflector means from reaching the detector plane of the integrating light detector means.

13. An optical pattern recognition architecture according to claim 1, wherein the input signals $s_1$ and $s_2$ are bandlimited to a bandwidth B such that $|S(f)|=0$ for $|f|>B$, and have unit variance; the light source intensity and the modulation of the optical deflector have respective variances of $m_1^2$ and $m_2^2$, and the light source with modulation depth m is limited to $\pm m/m_1$ standard deviations of the input signal $s_1$.

* * * * *